United States Patent [19]
Fitzgerald

[11] 3,890,261
[45] June 17, 1975

[54] HIGH SOLIDS CHLOROPRENE POLYMER LATEX

[75] Inventor: Kenneth D. Fitzgerald, Sugarland, Tex.

[73] Assignee: Petro-Tex Chemical Corporation, Houston, Tex.

[22] Filed: Apr. 15, 1974

[21] Appl. No.: 461,041

Related U.S. Application Data

[63] Continuation-in-part of Ser. No. 305,191, Nov. 9, 1972, abandoned.

[52] U.S. Cl...... 260/23.7 H; 260/27 R; 260/29.7 Q; 260/92.3
[51] Int. Cl............................ C08c 11/72; C08d 9/14
[58] Field of Search............ 260/29.7 Q, 23.7 H, 27, 92.3

[56] References Cited
UNITED STATES PATENTS

| | | | |
|---|---|---|---|
| 3,472,828 | 10/1969 | Montgomery | 260/29.7 Q |
| 3,651,037 | 3/1972 | Snow | 260/29.7 Q |
| 3,651,038 | 3/1972 | Snow | 260/29.7 Q |

Primary Examiner—Melvyn I. Marquis
Assistant Examiner—William E. Parker
Attorney, Agent, or Firm—N. Elton Dry; Kenneth H. Johnson

[57] ABSTRACT

Chloroprene polymer latexes of high solids produced by direct polymerization method with polymerization initiated with a portion of the total monomer and salts of (a) from .15 to 1.0 parts of fatty acid member (b) 0.3 to 4.0 parts of formaldehyde condensate of naphthalene sulfonic acid and (c) 1.4 to 4.0 parts of a rosin member. After peak polymerization viscosity is experienced additional monomer is added.

25 Claims, 1 Drawing Figure

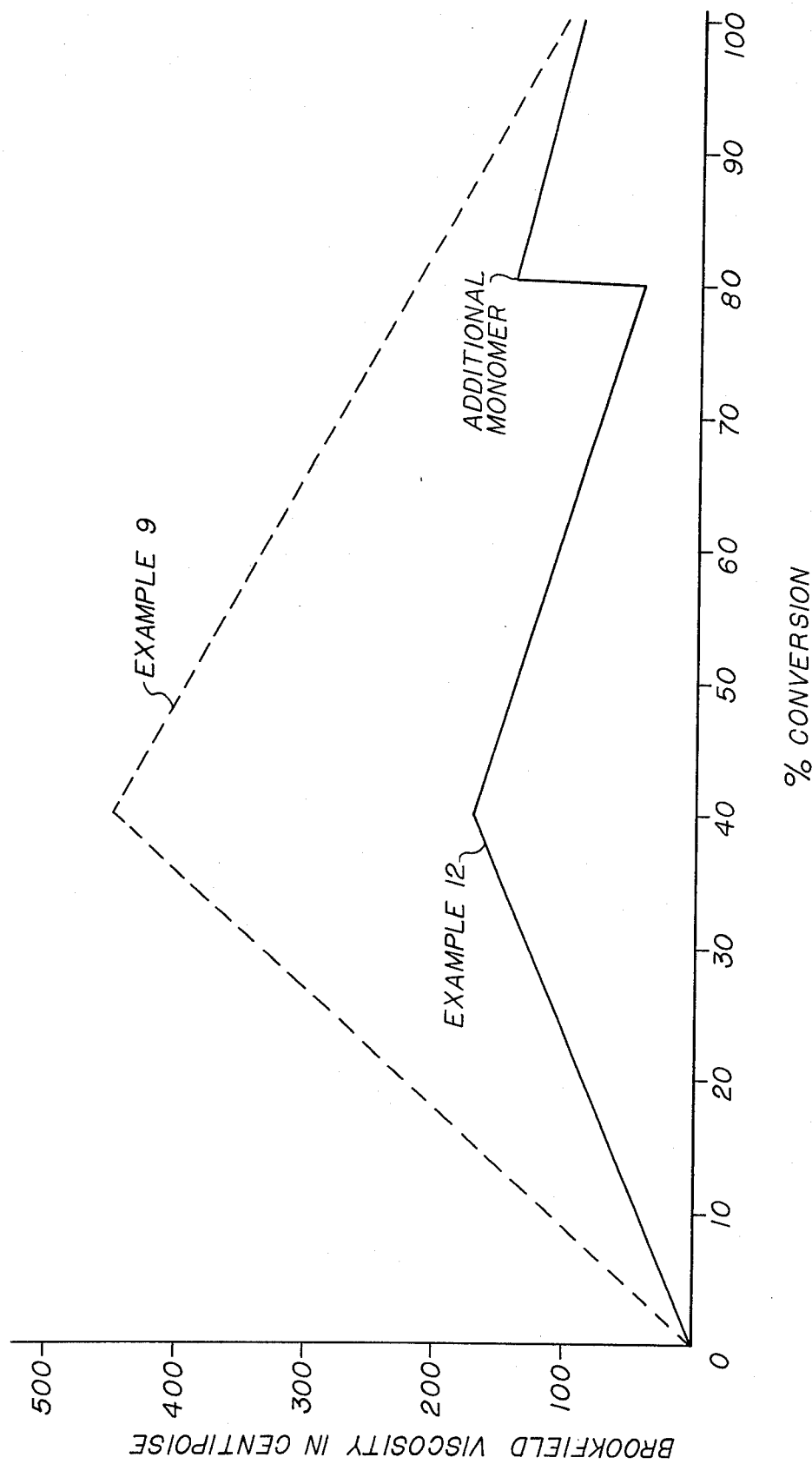

HIGH SOLIDS CHLOROPRENE POLYMER LATEX

This application is a continuation-in-part of Ser. No. 305,191 filed Nov. 9, 1972, now abandoned.

BACKGROUND OF THE INVENTION

This invention relates to a process for the production of high solids chloroprene polymer latexes or latices by a method of direct polymerization. Chloroprene polymers are produced by an emulsion polymerization process which normally produces a latex of low total solids content. However, for many applications chloroprene polymer latexes of high solids are required. For example, high solids latexes are desired for foam manufacture, impregnation, spraying and fiber bonding applications. For these types of latexes it is desired to have total solids content of at least 50 percent and preferably at least 60 percent total solids.

In emulsion polymerization of the type under consideration here the soap in the emulsion system forms micelles, which are groupings of soap molecules in which the polymer grows. The viscosity of a polymer system is relates to the particle size and thus can be influenced by varying the soap level in the emulsion, i.e., the lower the soap concentration, the larger the particle size and the lower the viscosity. However, as the soap concentration decreases, colloidal stability also decreases and is evidenced by floc formation and, in the case of severe instability, by coagulum formation.

The soap serves at least two functions in the polymerization of chloroprene. The first function is described above in regard to the initiation of the polymerization. In this function the soap is instrumental in controlling the size of the polymer particles. A high concentration of soap will provide many sites for polymerization, with the production of many particles of very small size. The small particles are tightly packed and cause high viscosity and the associated problems.

The second function of the soap is, however, dependent on having an excess of soap present in the polymerization. This function is the stabilizing of the polymer and is achieved by the adsorption of excess soap molecules (by charge attraction) onto the polymer particles. The soap in this way coats each polymer particle and hence prevents the polymer particles from coming into contact with each other and forming floc or coagulum. (Generally the polymer particles are micro in size. By agglomeration they become macro and are too large to be dispersed, hence are designated floc. Further agglomeration produces coagulum.)

To make high solids latex by the emulsion polymerization process there are two aspects that must be appreciated. First the polymer particles in an emulsion polymerization latex will be too numerous and too small, therefore agglomeration in some form at some time is always necessary. Second, as the monomer in the emulsion becomes greater than the water there will occur at a predictable time and to a degree, consistent with the parameters of emulsion polymerization, a "peak viscosity" accompanied by a condition of maximum instability of the emulsion. This peak viscosity occurs when the polymer particles originally initiated during the period of nucleation, have grown to the size necessary to absorb all of the remaining free monomer. At the peak viscosity the polymer particles are agglomerated or begin to agglomerate by the absorption of the solvent, i.e., monomer present. Hence, the peak viscosity is a critical point in direct emulsion polymerization to high solids latexes.

Prior art methods of concentration of synthetic latexes are discussed in Chapter 5 of D. C. Blackley, High Polymer Latices, Vol. 1 (Palmerton, 1966). In this book the numerous problems associated with production of a high solids latex by a direct polymerization process are discussed. One of the problems associated with the production of high solids latexes is that considerable stability problems are encountered both during polymerization and during storage of the latexes. Other problems associated with these methods are excessive viscosity during and after polymerization. In an effort to overcome the difficulties such as high viscosity and instability in directly producing high solids chloroprene polymer latexes various methods have been employed.

Many prior methods utilize a post polymerization technique of agglomeration, such as high pressure through an orifice as described by Bennett in U.S. Pat. No. 3,573,243, freeze/thaw as described by Carpenter in U.S. Pat. No. 2,993,020, cooling to achieve gelation commonly known as "stockpunt," or by one of the creaming techniques such as with ammonium alginate as described by Wilder in U.S. Pat. No. 2,405,724. Other methods seek to carefully balance the essential ingredients within rigidly defined critical ranges, thereby minimizing the detrimental effects of direct polymerization, e.g. U.S. Pat. Nos. 3,651,037 and 3,651,038.

One of the advantages of the present invention is that high solids latexes are produced by a direct polymerization process which has good stability and reduced viscosity problems during polymerization and also produces a latex which has good storage stability. Another advantage of the invention is that it provides a method of controlling peak viscosity during the polymerization. A particularly interesting feature of the present process and the latexes produced thereby are faster cure rates. A significant advantage of the present process is that it allows a 100 percent conversion of the monomer present. These and other advantages and features will become apparent from the following discussion of the invention.

DRAWING

The FIGURE is a comparison of the viscosity effect versus conversion of the polymerization of chloroprene according to the prior art (dotted line) and the present invention (solid line).

SUMMARY OF THE INVENTION

According to this invention high solids chloroprene latexes containing at least 55 percent by weight of solids may be obtained by polymerizing chloroprene containing up to 25 percent by weight of another ethylenically unsaturated organic monomer copolymerizable with chloroprene by 1. initiating the polymerization with less than the total amount of monomer in emulsion containing salts of from (a) .15 to 1.0 parts of a fatty acid member which can be a fatty acid, polymerized fatty acid, or mixtures thereof, (b) .30 to 4.0 parts of a rosin member which can be the various rosins, modified rosin, or polymerized rosin;

2. polymerizing the aqueous emulsion until the viscosity of the polymerization mixture reaches a peak;

3. determining said peak viscosity has been reached;

4. continuing said polymerization until said viscosity at least begins to decline;

5. adding the remaining monomer and continuing polymerization to form a chloroprene polymer latex having at least 55 percent solids by weight; provided the weight parts of said (a), (b) and (c) are based on 100 parts of monomer charged up to the time of the initial peak viscosity. A portion of the total amount of water may be withheld at the initiation of the polymerization but will be added prior to the peak viscosity.

DETAILED DESCRIPTION OF THE INVENTION

The maximum instability in an emulsion polymerization system occurs at the point of peak viscosity. By carrying out the polymerization according to the present invention, i.e., withholding a portion of the total monomer from the polymerization to a point beyond the peak viscosity whereat a slight drop in viscosity might be noted, the system is very stable (stability denotes the absence of floc and/or coagulum.) The reason for this is that all of the monomer present in the system is either reacted or absorbed in the existing polymer molecules, yet there is an adequate amount of soap present in the system to coat each molecule sufficiently to prevent premature agglomeration. Also by having less than 100 percent of the monomer present in the initial stage of the polymerization, the effective lower monomer to water ratio results in a lower peak viscosity than in a system wherein all of the monomer is added initially.

Merely reducing the amount of soap in the polymerization is self-defeating since reduced soap will generally result in floc and coagulum; however, by withholding a portion of the monomer from the polymerization, lower amounts of soap than generally contemplated in the art are used, without the instability; this is, with a lower soap concentration there are fewer sites for polymer development, and hence, few polymer particles. Thus, a reduced amount of soap is sufficient to inhibit premature agglomeration.

In the practice of the present invention only the monomer component of principal polymerization components is withheld. The total amount of water, soap (rosin and fatty acid members, etc.) and condensation product and 60 to 90 percent by weight of the total amount of monomer are polymerized initially, i.e., up to the peak viscosity. After the peak viscosity the balance of the monomer (no water) is added to the system. This can be done as one increment of monomer or as several. Reference to the drawing will show the significant difference in the viscosity profile of two polymerizations, wherein the only difference is the withholding of a portion of the monomer (solid line). This will be discussed later in regard to the examples, but it can be seen that according to present invention, peak viscosity is low and a second lower still viscosity peak results.

Generally, the peak viscosity (depending on the system under consideration) will occur at monomer conversion in the range or 35 to 45 percent.

No additional water is added because the process is one to produce high solids. Preferably at least 55 percent by weight of the latex is solid polymer. Moreover, if the water which is present during the initial peak viscosity is less than the total of the final latex, high viscosity will result because of the tighter packing of the polymer particles. It is preferred to control the peak viscosity to no greater than 300 centipoise as measured with a No. 2 Brookfield spindle at 45° C. With lower final latex solids such as 55 percent solids preferably the peak viscosity will be no greater than 225 centipoise.

According to this invention polymers of chloroprene, 2-chloro-1,3 butadiene are polymerized to form high solids latexes. The term "polymers of chloroprene" encompasses polymers in which chloroprene is the major or predominant monomer. Comonomers may also be employed such as 2,3-dichloro-1,3-butadiene; acrylonitrile, methyl methacrylate and so forth. Usually, the total amount of ethylenically unsaturated comonomers will represent no greater than 25 mol percent of the total monomers and preferably will constitute less than 15 or 20 mol percent of the total monomers including chloroprene. The polymerization of chloroprene in aqueous emulsion is well known and any such system which does not interfere with the novel characteristics of this invention can be employed. Processes and methods for the polymerization and recovery of chloroprene are disclosed, for example, in Encyclopedia of Polymer Science and Technology, Vol. 3, page 705–730 (Interscience, 1965) and in numerous patents such as U.S. Pat. Nos. 2,264,173 and 2,264,191 both issued on Nov. 25, 1941.

The polymerization mixture should contain a salt of from 0.15 to 1.0 parts of a fatty acid member selected from a group consisting of fatty acid, polymerized fatty acids and mixtures thereof per 100 parts of monomer present during the time of peak viscosity. The fatty acid members may be saturated or unsaturated carboxylic acids having from 12 to 30 carbon atoms or may be the products prepared by dimerizing or trimerizing the unsaturated fatty acids such as lauric, stearic, eicosanoic, oleic, linoleic and dimers and trimers of unsaturated fatty acids such as linoleic acid. Of the unpolymerized fatty acids those having 16 to 18 carbon atoms are preferred with oleic being a particularly preferred fatty acid. Of the polymerized unsaturated fatty acids those of monomers of 16 to 18 carbon atoms are preferred such as polymers of linoleic acid. Generally, these polymers will be mixtures of dimeric and trimeric materials. An example of linoleic acid polymer is a polymer containing about 75 percent of the dimer, about 22 percent trimer and about 3 percent monomer. Suitable polymerized unsaturated fatty acids are disclosed in U.S. Pat. No. 2,876,203. Best results have been obtained with the polymerized unsaturated fatty acids. From about 0.15 to 1.0 parts of the fatty acid member may be employed with a preferred range being from 0.4 to 0.8 parts based on the monomer charged up to the time of initial peak viscosity. The percentages are calculated based on the weight of the fatty acid member rather than as the salt.

The second surface active agent is a salt of a rosin member. The rosin member may be any of the various rosins such as gum rosin, wood rosin (including e.g., Nancy wood rosin and N grade) or tall oil rosin or the modified rosins or polymerized rosins. Those rosin members may be of natural or synthetic origin. Modification may be by hydrogenation, polymerization or disproportionation and combinations thereof. The suitable rosins are those that have resin acids present and which have been used as emulsifiers in polychloroprene polymerizations. Rosins and rosin derivatives are described in Vol. 12 of Encyclopedia of Polymer Science, pp. 139–156 (Interscience, 1970). Although a variety of rosins may be employed certain rosin acids are superior and constitute a preferred embodiment of this invention. The wood rosins produce polymers of good stability but the preferred species is disproportionated rosin such as have been prepared by hydrogenating and dehydrogenating the unsaturated ingredients. Disproportionated rosins are described in the cited volume 12 and in U.S. Pat. Nos. 2,154,629 and 2,201,237. Disproportionated rosins are available such as the 731 series from Hercules, Inc. The amount of rosin member should be from 1.4 to 4.0 and preferably from 1.8 to 3.0 parts per 100 parts of monomer charged up to the time of initial peak viscosity.

The third surface active agent is the salts of the condensation products of naphthalene sulfonic acids and formaldehyde such as described in U.S. Pat. Nos. 1,336,759; 2,046,757 and 2,264,173 and Blackley, High Polymer Latices, Vol. 1, pp. 103–5, 1966 (sometimes referred to herein as "condensation product" for convenience). The condensation product shall be present in an amount of from 0.30 to 4.0 parts, and preferably from 1.0 to 3.0 parts per 100 parts of monomer charged up to the time of peak viscosity.

The described fatty acid member, rosin member and condensation product are at least partially or essentially completely converted to salts either prior to or during polymerization. Thus, the salt may be added as such or formed in situ. The compounds will be salts of alkali metals or ammonia. For better stability and solubility the salts will be potassium, sodium or ammonium salts and a preferred embodiment of this invention is wherein at least 50 percent of the cations are potassium.

Excellent results have been obtained when the combined total of the rosin member and the fatty acid member is from 1.5 to 2.5 parts by weight per 100 parts of total monomer used prior to terminating the polymerization and preferably this same ratio is present based on the monomer charged up to the time of the initial peak viscosity. Also excellent results have been achieved when the ratio of the rosin member to the fatty acid member is at least 2.0 at the time of peak viscosity. To achieve optimum stability it has been discovered that the fatty acid member is preferably present in an amount of at least 0.30 parts by weight per 100 parts of monomer charged up to the time of initial peak viscosity.

Other surface active agents may be present to aid in the polymerization stability so long as they do not interfere with the novel characteristics of the three preferred surface active agents. Examples of such agents useful in chloroprene polymerization are disclosed in U.S. Pat. No. 2,264,173.

The usual methods may be employed to prepare an aqueous emulsion of the monomeric material and emulsifying agent and water. The proportions of water to monomer will be adjusted to result in the final high solids latex. Normally, from about 55 to 95 parts of water will be charged per 100 parts of monomer present prior to and during the peak viscosity. The amount of water will be varied, of course, depending on the proportion of the total monomer which is present prior to the addition of monomer after the peak viscosity.

According to this invention less than the total amount of monomer is present in the reactor during the period of initial peak viscosity. The exact percentage of monomer present can be varied somewhat depending for example on the particular combination of surface active agents used. However, generally the monomer present during this initial peak viscosity will be from about 60 to 90 percent of the total. This initial monomer may be charged to the reactor prior to polymerization initiation or may be partially charged and partially fed so long as the required amount is present during initial peak viscosity. Generally, all of the first charge of monomer will be charged prior to initiation in order to have adequate monomer present for formation of large polymer particles. After the initial peak viscosity has been experienced the additional monomer may be added in any manner in one or more increments or may be fed continuously or semi-continuously. Some judgment should be exercised regarding the time of addition of monomer. For instance, the viscosity of the reaction mixture should be allowed to subside to some extent prior to monomer addition in order to obtain maximum benefit from this invention. Reference in the specification and claims to the amount of monomer charged up to the time of peak viscosity is understood to include any initial charge of monomer plus any monomer fed to the point of peak viscosity.

The pH of the aqueous emulsion for polymerization may be varied depending upon the particular emulsification system employed and can be acidic, neutral or alkaline; however, it is preferred to have a pH in the range of about 7 to 13.5.

Conventional catalysts for chloroprene polymerization may be employed and preferred catalysts are peroxide catalysts of the organic or inorganic type. Examples of organic peroxides are benzoyl peroxide, cumene hydroperoxide, tertiary-butyl isopropylbenzene hydroperoxide, azo catalysts such as alpha-alpha' -azo-bis-isobutyronitrile and the like Suitable inorganic peroxides are such as inorganic per acids including per sulfates, perborates or percarbonates e.g. ammonium or potassium per sulfate and hydrogen peroxide. The catalyst may be used in amounts required to bring about polymerization at any desired rate with suitable ranges being from 0.001 to 0.5 parts by weight per 100 parts of polymerizable monomer.

Modifiers or other agents may be present in the emulsion. For instance, the polymerization may be carried out in the presence of sulfur to produce a sulfur modified polychloroprene. Also, chain transfer agents may be employed such as the dialkyl xanthogen sulfides and as the dialkyl xanthogen disulfides, alkyl mercaptans, e.g., dodecyl mercaptan, iodoform and benzyl iodide. Modifiers and chain transfer agents can also be added along with the withheld portion of the monomer.

The degree of polymerization and characteristics of the polymer can be controlled as is known in the art. The production of either benzene soluble or benzene insoluble polymers is within the scope of this invention. The degree of conversion of monomer can be varied but it has been discovered that superior products are produced when the degree of conversion is at least 90 or 95 percent by weight. Superior products are produced, such as greater tensile strength, when there is essentially no monomer stripping such as less than 3 percent of the total monomer being present at the end of the run. Conversions of at least about 98 percent are preferred.

The temperature of polymerization may be varied depending upon the particular type of polymer being employed with suitable ranges being from 0°C to 90°C with the preferred range being between 15°C and 55°C. The polymerization may be short stopped by the addition of agents such as para-tertiarybutyl catechol and thiodiphenylamine but it is a preferred feature of this invention that the polymerization is not short stopped but rather goes to high conversion. The process of polymerization may be either continuous or may be conducted in batch.

Agents to increase the stability during polymerization and on aging may be added. For instance sulfates, the various rosins or modified rosins, fatty acids, polymerized fatty acids and salts such as sodium, potassium or ammonium salts of these compounds, diethanolamine and other known latex stabilizers may be added to the latex after polymerization.

The latexes of this invention after polymerization to produce the high solids latex may be partially or completely cured or vulcanized prior to use such as reacting with mono or polyamines having from one to 8 or 10 carbon atoms including amines such as those disclosed in U.S. Pat. No. 3,686,156.

EXAMPLES

To illustrate the invention a series of examples are run. These examples are all run in a 5 liter glass reactor equipped with a paddle agitator and are run under a nitrogen atmosphere at 45°C. In all of these examples no catalyst is charged or the reactor initially, but a mixture of 0.25 percent potassium persulfate, 0.05 percent silver salt (sodium-2-anthraquinone sulphonate) and 99.7 percent water is fed until the total monomer has reached 80 percent conversion at which time the pumped catalyst mixture is 4.5 percent potassium persulfate, 0.1 percent silver salt, 95.4 percent water. Polymerization is controlled to achieve about 95 percent conversion at 6 hours with the final percent conversion being about 99.5 percent after about an additional 4 hours. Viscosities are run with a Brookfield No. 1 or No. 2 spindle at 60 rpm (No. 1 for viscosities below 100 centipoise) and are measured at polymerization temperatures during the run and at 25°C. for all other viscosities. Initial peak viscosity during polymerization is recorded at the measured point of maximum viscosity. Generally, this peak comes about two hours after initiation of polymerization. No post polymerization stabilizers are added to these runs. Unless indicated otherwise all parts are by weight. In the case of the surfactants or additives the parts are based on the surfactants as received from the manufacturer.

The stability observations are visible observations except in the case where numbers are indicated. The determination of percent coagulum in the reactor is determined by straining the latex through a double thickness of cheese cloth and the percent coagulum is based on the weight of the monomer charged.

These examples are only exemplary and are not intended to limit the invention.

Examples 1 to 4

A series of runs is made to illustrate the problems associated with the prior art method of charging all of the monomer prior to the peak viscosity. Examples 1 – 4 illustrate these recipes. Examples 1 – 4 utilize a constant amount of the condensation product (Daxad 11 KLS). The amount of polymerized fatty acid (Empol 1022) is varied is an attempt to suppress floc formation during the run and in an attempt to improve stability. In these runs also the modified rosin (Resin 731-SA) is varied in an attempt to control the peak viscosity and the stability during the run.

| Example | 1 | 2 | 3 | 4 |
|---|---|---|---|---|
| Chloroprene | 100.00 | 100.00 | 100.00 | 100.00 |
| Resin 731-SA[1] | 1.80 | 1.00 | 0.90 | 1.67 |
| Diisopropyl xanthogen disulfide | 0.30 | 0.30 | 0.30 | 0.30 |
| Water | 60.50 | 60.50 | 60.50 | 60.50 |
| Potassium Hydroxide | 1.30 | 1.30 | 1.30 | 1.30 |
| Daxad 11 KLS[2] | 2.00 | 2.00 | 2.00 | 2.00 |
| Empol 1022[3] | 0.18 | 1.00 | 0.90 | 0.33 |
| Peak Brookfield Viscosity (cps) | 145.0 | 460.0 | 385.0 | 187.0 |
| Final solids (%) | 60.9 | 59.1 | 59.8 | 60.3 |
| Final Viscosity (cps)[4] | 71.0 | 193.0 | 252.0 | 61.0 |
| Stability Observations | | | | |
| Floc at 2 hours | slight | none | none | slight |
| Coag. in reactor | <0.1% | ≈0.2% | ≈0.2% | none |
| Flock after 24 hours | slight | none | none | slight |
| Flock after 1 week | moderate | slight | slight | moderate |

[1]Disproportionated wood rosin obtained from Hercules, Inc. with specifications of minimum of 60° for specific rotation, acid number of 137 to 145, minimum of 48% dehydroabietic acid, maximum of 1.9 ultra violet absorptivity at 245 millimicrons. The 731-SA is soda ash treated 731-S disproportionated wood rosin. About 1.8 parts is equivalent to 1.76 parts of free acid rosin.
[2]The material used is "Daxad 11 KLS" supplied by W. R. Grace and Co. It is the potassium salt of the condensate of formaldehyde and alkylnaphthalene-sulfonic acid; it is stable in the presence of mild acids and alkalies; it has practically no tendency to foam and it has a pH (1% sol. at 72°F.) of 7 to 8.5. Parts are based on the material as received from the manufacturer.
[3]Essentially a $C_{36}$ dibasic acid resulting from the polymerization of linoleic acid. The dimer content is about 75%, the trimer content is about 22% and the monomer content is about 3%. It is commercially available as "Empol 1022" from Emery Industries, Inc.
[4]To be rigidly compared final viscosities should be adjusted for percent solids using a solids vs. viscosity curve.

Examples 5 – 7

The process of the present invention is illustrated in Examples 5, 6 and 7. Example 4 is a comparative run and is the same as Example 4 above.

In Example 4 all of the monomer is charged initially. In Examples 5 and 6, 66.66 percent of the monomer is charged initially and after the peak viscosity is experienced the first increment of 16.67 percent is added. Thereafter the second increment is added. In the case of Example 7, 83.32 percent of the monomer is charged initially and after the peak viscosity the remainder of the monomer is added. In all of these Exam-

| Example | 4 | 5 | 6 | 7 |
|---|---|---|---|---|
| Chloroprene | 100.00 | 66.66 | 66.66 | 83.32 |
| First chloroprene increment | — | 16.67 | 16.67 | 16.68 |
| Second chloroprene increment | — | 16.67 | 16.67 | — |
| Resin 731-SA | 1.67 | 1.67[1] | 1.86[4] | 1.86[6] |
| Diisopropyl xanthogen disulfide | 0.30 | 0.30 | 0.30 | 0.30 |
| Water | 60.50 | 60.50 | 60.50 | 60.50 |
| Potassium Hydroxide | 1.30 | 1.30 | 1.30 | 1.30 |
| Daxad 11 KLS | 2.00 | 2.00[2] | 2.00[2] | 2.00[7] |
| Empol 1022 | 0.33 | 0.33[3] | 0.14[5] | 0.14[8] |
| Peak Brookfield Viscosity (cps) | | | | |
| Original charge | 187.0 | 27.5 | 19.0 | 42.5 |
| After final monomer addition | — | 320.0 | 140.5 | 90.0 |
| Final solids (%) | 60.3 | 61.9 | 60.5 | 59.9 |
| Final Viscosity (cps) | 61.0 | 135.0 | 78.0 | 59.0 |
| Stability Observations | | | | |
| Floc at 2 hrs. | slight | none | slight | none |
| Coag. in reactor | none | none | none | none |
| Floc after 24 hrs. | slight | none | moderate | slight |
| Floc after 1 week | moderate | slight | moderate | slight |

[1] Equivalent to 2.5 parts based on monomer present during peak viscosity
[2] Equivalent to 3.0 parts based on monomer present during peak viscosity
[3] Equivalent to .50 parts based on monomer present during peak viscosity
[4] Equivalent to 2.8 parts based on monomer present during peak viscosity
[5] Equivalent to .21 parts based on monomer present during peak viscosity
[6] Equivalent to 2.2 parts based on monomer present during peak viscosity
[7] Equivalent to 2.4 parts based on monomer present during peak viscosity
[8] Equivalent to .17 parts based on monomer present during peak viscosity ples 5, 6 and 7 after each monomer addition the polymerization is allowed to proceed to 80 percent conversion prior to the addition of the monomer increment. The final conversion is about 99.5 weight percent based on the total monomer charged. Example 5 illustrates a low peak viscosity of 27.5 as compared to 187.0 for Example 4. The latex of Example 5 is stable during polymerization and on storage. Example 6 has excellent peak viscosity of 19.0 but is borderline on stability because of the low level of polymerized fatty acid. In Example 7 a low peak viscosity is achieved with good stability. In Example 5 the peak viscosity after the final monomer addition is 320 which might be considered high but this run illustrates that high viscosities can be tolerated late in the polymerization. It is noted that good latex stability is achieved even though there is a high peak viscosity late in the polymerization.

Example 8

Example 8 illustrates a preferred embodiment of this invention in which the three salts are controlled within a preferred range. In this run the monomer is added in a single increment after peak viscosity and after the first monomer has gone to 80 percent conversion. The first peak viscosity is 120 which is low enough to achieve reactor temperature control and agitation control during the run. Although the peak viscosity after final monomer addition is 325 this viscosity at this point in the polymerization is not particularly deleterious. The final viscosity of the latex is 117.5 which is entirely suitable in the final product. The stability of the final latex is excellent with no floc formation or coagulum observed in the reactor.

| Example | 8 |
|---|---|
| Initial chloroprene charge | 83.32 |
| Chloroprene increment | 16.68 |
| Resin 731-SA | 1.86 |
| Diisopropyl xanthogen disulfide | 0.30 |
| Water | 60.50 |
| Potassium Hydroxide | 1.30 |
| Daxad 11 KLS | 2.00 |
| Empol 1022 | 0.50 |
| Peak Brookfield Viscosity (cps) | |
| Original charge | 120.0 |
| After monomer addition | 325.0 |
| Final solids (%) | 61.0 |
| Final Viscosity (cps) | 117.5 |
| Stability Observations | |
| Floc at 2 hrs | none |
| Coag. in reactor | none |
| Floc after 24 hrs | none |
| Floc after 1 week | none |

Examples 9 – 12

To further illustrate the effect of incremental addition of monomer on the viscosity and colloidal stability, the following latexes were prepared using the recipe of example eight with only the monomer ratio changed.

By using 0.5 parts of the dibasic fatty acid, the agglomeration by electrolytes prior to the peak viscosity will be significantly reduced, and the colloidal stability will be improved, leaving the desired amount of agglomeration dependent on the monomer swollen polymer particle as reflected by the peak viscosity.

Examples 9, 10, 11 and 12 would be commercially acceptable, but example 11 is much the better latex.

Example 9 would be too viscous to be made on a plant scale, without experiencing heat transfer problems and the quality of the latex would vary greatly.

The stability observations are made by wetting a clear piece of glass with latex and permitting the latex to drain until it is transparent and then observing the pin point particles of agglomerated latex on the glass. The results are set out below in tabular form.

prepared by this invention a comparison was made with the commercially available high solids latexes manufactured by Du Pont and Bayer. All of these tests were evaluated in a standard china clay formulation as follows:

| EXAMPLE | 9 | 10 | 11 | 12 |
|---|---|---|---|---|
| Initial monomer charge % | 100.0 | 60.0 | 60.0 | 90.0 |
| 1st additional increment | — | 20.0 | 25.0 | 10.0 |
| 2nd additional increment | — | 20.0 | 15.0 | |
| Peak Viscosities [Brookfield (cps)] | | | | |
| Original charge | 450 | | 17.0 | 175.0 |
| *1st additional monomer | — | 80.0 | 122.5 | 145.0 |
| *2nd additional monomer | — | 398.0 | 225.0 | |
| Final at 25° C. | 107.5 | 140.0 | 110.0 | 97.5 |
| Final solids % | 61.47 | 60.40 | 61.24 | 60.47 |
| Stability Observations (visual)** | | | | |
| Prefloc at 2 hours | slight | none | none | none |
| Prefloc after final increment | | slight | none | none |
| Coag in reactor | none | none | none | none |
| Prefloc after 24 hours | moderate | slight | slight | slight |
| Prefloc after 1 week | moderate | slight | slight | moderate |

*The additional monomer increments in these examples were added instantaneously, and this produces the maximum possible viscosity. On a plant scale the second additional monomer increment of example 10 would be added over a considerable period of time (30 to 60 minutes) and the high viscosity would not be experienced.
**"Moderate" is taken to mean more than "slight". These terms are used in their standard usage. The term "slight" shall mean - small of its kind or in amount, scant, meager, and the term "moderate" shall mean - tending toward the mean or average quality.

To graphically demonstrate the startling improvement achieved by the present method of direct polymerization to high solids latexes, the drawing has been prepared showing the Brookfield viscosity. The dotted line represents the prior art (Example 9) wherein all of the monomer is added in the initial stage of polymerization. The solid line is the present invention (Example 12). It can be seen, not only is the peak viscosity lower but the overall viscosity profile of the present invention is lower, representing a considerable savings in process energy. Even the "secondary" peak viscosity resulting from the addition of the withheld monomer is lower than prior arts viscosity at the same conversion.

| Ingredient | Dry Weight Basis |
|---|---|
| Latex | 100.0 |
| Dixie clay | 10.0 |
| Antioxidant 2246 (2,2'-methylene bis (4-methyl-6-tert-butyl phenol)) | 2.0 |
| zinc oxide | 5.0 |
| Sodium dibutyl dithiocarbamate | 1.0 |
| Tetraethyl thiuram disulphide | 1.0 |

The compounding ingredients are prepared as dispersions by ball milling with suitable stabilizers and added to the latex with stirring. Dipped films are prepared from the latex by dipping glass formers first into a coagulant solution, secondly into the compounded latex and thirdly into coagulant solution. The films are washed and test pieces cut for measurement, leached for 2 hours at 40°C. and dried in an air oven at 45° C. for 4 hours to give the uncured products. Curing was carried out in an air oven at 140°C. for 30 minutes to give the cured products. The resulting formulation exhibited the modulus tensile strength and elongation values of the following table:

COMPARISON OF HIGH SOLIDS LATEXES

To illustrate the physical properties of the latexes

| Property | Cure Time mins. at 140°C. | Bayer CMKB No. 1 | Bayer CMKB No. 2 | Du Pont ECD-2931 No. 1 | Du Pont ECD-2931 No. 2 | Example No. 8 |
|---|---|---|---|---|---|---|
| Modulus at 300% | 0 | — | 130 | — | 115 | 95 |
| | 5 | — | 175 | — | 175 | 295 |
| | 15 | — | 200 | — | 195 | 270 |
| | 30 | — | 205 | — | 180 | 280 |
| | 45 | — | 205 | — | 190 | 295 |
| Modulus at 600% | 0 | 370 | 365 | 440 | 225 | 200 |
| | 5 | 470 | 425 | 770 | 490 | 800 |
| | 15 | 500 | 550 | 840 | 495 | 945 |
| | 30 | 485 | 565 | 860 | 535 | 1075 |
| | 45 | 490 | 615 | 860 | 555 | 1080 |
| Tensile Strength | 0 | 2010 | 2035 | 2515 | 1830 | 1305 |
| | 5 | 2375 | 2560 | 2600 | 3395 | 3950 |
| | 15 | 2680 | 3400 | 3105 | 3750 | 4230 |
| | 30 | 2955 | 3975 | 3245 | 3815 | 4175 |
| | 45 | 3555 | 3745 | 3200 | 3730 | 4340 |

Comparison of High Solids Latex Physical Properties

—Continued

Comparison of High Solids Latex Physical Properties

| Property | Cure Time mins. at 140°C. | Bayer CMKB No. 1 | Bayer CMKB No. 2 | Du Pont ECD-2931 No. 1 | Du Pont ECD-2931 No. 2 | Example No. 8 |
|---|---|---|---|---|---|---|
| Elongation | 0 | 1100 | 1300 | 1100 | 1550 | 1500 |
| | 5 | 1100 | 1100 | 900 | 950 | 910 |
| | 15 | 1100 | 1025 | 850 | 925 | 840 |
| | 30 | 1050 | 1050 | 875 | 900 | 825 |
| | 45 | 1050 | 1000 | 885 | 925 | 825 |

The tensile strength values of the latex prepared according to this invention indicate that a film as strong as that compared to the Du Pont or Bayer latex and also that a rapid cure occurs. That is, after five minutes the tensile strength was considerably higher than the other materials even though the uncured value was lower than the other samples. The latex of this invention has a low initial modulus and increases considerably more than either the Du Pont or Bayer material.

Example 13

In this run the rosin was tall oil rosin. The recipe was:
| | |
|---|---|
| Chloroprene | 83.00 |
| Tall Oil Rosin | 1.85 |
| DDM* | 0.05 |
| H₂O | 60.00 |
| KOH (as is) | 1.30 |
| Empol 1022 | 0.50 |
| DAXAD 11KLS (as is) | 2.00 |

After initial peak viscosity
| | |
|---|---|
| Chloroprene (2nd aliq.) | 17.00 |
| DDM | 0.05 |

Peak Brookfield Viscosity (cps)
| | |
|---|---|
| Original charge | 220 |
| After final monomer addition | 580 |
| Final Viscosity (cps) | 300 |

Stability was quite good
The polymer had the following properties:

600% mod.
| | |
|---|---|
| No cure | 385 |
| 30 min. cure | 1205 |

Tensile
| | |
|---|---|
| No cure | 2165 |
| 30 min. cure | 3620 |

% elongation
| | |
|---|---|
| No cure | 1215 |
| 30 min. cure | 800 |

*n-Dodecyl Mercaptan

Note the excellent tensile, no cure, and moderate 600 percent modulus, no cure.

The invention claimed is:

1. A process for the production of high solids latexes having greater than 55 percent by weight of solids which comprises
   1. polymerizing monomers comprising chloroprene containing up to 25 percent by weight of another ethylenically unsaturated organic monomer copolymerizable with chloroprene in an aqueous emulsion containing 60 to 90 percent of the total of said monomer, 100 percent of the total of water, and salts of cations selected from the group consisting of alkali metals, ammonia and mixtures thereof (a) from 0.15 to 1.0 parts of a fatty acid member selected from the group consisting of unpolymerized fatty acid, polymerized fatty acids and mixtures thereof (b) from 0.30 to 4.0 parts of a formaldehyde condensate of a naphthalene sulfonic acid lected from the group consisting of rosins, disproportionated rosins and polymerized rosins until the viscosity of the polymerization mixture reaches a peak viscosity;
   2. determining said peak viscosity has been reached;
   3. continuing said polyemerization until said viscosity at least begins to decline; and
   4. adding the remaining monomer and continuing polymerization to to form a chloroprene polymer latex having greater than 55 percent solids by weight; provided the weight parts of said (a) are based on the weight of said fatty acid member, the weight parts of said (b) are based on the weight of said salt calculated as a salt and the weight parts of said (c) are based on the weight of said rosin member with all of the weights of (a), (b) and (c) being based on 100 parts of monomer charged up to the time of said peak viscosity.

2. The process of claim 1 wherein the said salts are selected from the group consisting of sodium, potassium, ammonium salts and mixtures thereof.

3. The process of claim 2 wherein the said salts are at least 50 percent by weight potassium soaps.

4. The process of claim 1 wherein the said chloroprene polymer latex having greater than 55 percent by weight solids is used as a latex without isolation of the chloroprene polymer solids prior to use.

5. The process of claim 1 wherein the said chloroprene polymer latex is partially vulcanized prior to use as a latex.

6. The process of claim 1 wherein the viscosity of the polymerization mixture at the said peak viscosity prior to the monomer addition is at a viscosity of no greater than 300 centipoise Brookfield viscosity as measured with a No. 2 spindle at 45° C.

7. The process of claim 1 wherein the viscosity of the said high solids latex at the end of the polymerization is no greater than 300 centipoise Brookfield viscosity as measured with a No. 2 spindle at 25°C.

8. The process of claim 1 wherein the said fatty acid is a polymerized fatty acid.

9. The process of claim 1 wherein the said rosin member is a tall oil rosin.

10. The process of claim 1 wherein the said rosin member is a disproportionated rosin.

11. The process of claim 1 wherein the combined total of the said rosin member and the said fatty acid member is from 1.5 to 2.5 parts by weight per 100 parts of total monomer used prior to terminating the polymerization.

12. The process of claim 1 wherein the ratio of the said rosin member to the said fatty acid member is at least 2.0 at the time of initial peak viscosity of (2).

13. The process of claim 1 wherein the said fatty acid member is at least 0.30 parts by weight per 100 parts of the monomer present at the time of initial peak vis- 14. The process of claim 1 wherein the weight percent conversion at the time of terminating polymerization is at least 95 percent of the total monomer present during polymerization.

15. The process of claim 1 wherein the said salts at the time of the said peak polymerization is (a) from 0.4 to 0.8 parts of said fatty acid member (b) from 1.0 to 3.0 parts of said formaldehyde condensate and (c) from 1.8 to 3.0 parts of said rosin member with all parts being based on 100 parts of monomer present during the said peak viscosity.

16. The process of claim 1 wherein a dialkyl xanthogen sulfide is present as a polymerization chain transfer agent.

17. The process of claim 1 wherein the said high solids latex is produced essentially without stripping monomer at the end of polymerization.

18. The process according to claim 15 wherein said rosin is tall oil rosin.

19. The process according to claim 15 wherein said rosin is disproportionated wood rosin.

20. The process according to claim 1 wherein a polymerization chain transfer agent is added to said polymerization with the remaining monomer.

21. The process according to claim 1 wherein dodecyl mercaptan is present as a polymerization chain transfer agent.

22. The process according to claim 1 wherein 100 percent of the total water is present when the polymerization is initiated.

23. As a composition of matter the high solids latex having greater than 55 percent by weight of solids which comprises
1. polymerizing monomers comprising chloroprene containing up to 25 percent by weight of another ethylenically unsaturated organic monomer copolymerizable with chloroprene in an aqueous emulsion containing 60 to 90 percent of the total of said monomer, 100 percent of the total of water, and salts of cations selected from the group consisting of alkali metals, ammonia and mixtures thereof (a) from 0.15 to 1.0 parts of a fatty acid member selected from the group consisting of unpolymerized fatty acid, polymerized fatty acids and mixtures thereof (b) from 0.30 to 4.0 parts of a formaldehyde condensate of a naphthalene sulfonic acid and (c) from 1.4 to 4.0 parts of a rosin member selected from the group consisting of rosins, disproportionated rosins and polymerized rosins until the viscosity of the polymerization mixture reaches a peak viscosity;
2. determining said peak viscosity has been reached;
3. continuing said polymerization until said viscosity at least begins to decline; and
4. adding the remaining monomer and continuing polymerization to to form a chloroprene polymer latex having greater than 55 percent solids by weight; provided the weight parts of said (a) are based on the weight of said fatty acid member, the weight parts of said (b) are based on the weight of said salt calculated as a salt and the weight parts of said (c) are based on the weight of said rosin member with all of the weights of (a), (b) and (c) being based on 100 parts of monomer charged up to the time of said peak viscosity.

24. In the process of preparing high solids latexes having greater than 55 percent by weight of solids which comprises polymerizing monomers comprising chloroprene containing up to 25 percent by weight of another ethylenically unsaturated organic monomer copolymerizable with chloroprene in the presence of water, and salts of cations selected from the group consisting of alkali metals, ammonia and mixtures thereof (a) from 0.15 to 1.0 parts of a fatty acid member selected from the group consisting of unpolymerized fatty acid, polymerized fatty acids and mixtures thereof (b) from 0.30 to 4.0 parts of a formaldehyde condensate of a naphthalene sulfonic acid and (c) from 1.4 to 4.0 parts of a rosin member selected from the group consisting or rosins, disproportionated rosins and polymerized rosins wherein the improvement comprises
initiating said polymerization in an aqueous emulsion containing 60 to 90 percent of the total of said monomer, fatty acid member, formaldehyde condensate and rosin member
polymerizing until it has been determined the peak viscosity for the polymerization has occurred, the total amount of water being present in the polymerization prior to the peak viscosity,
continuing said polymerization and determining that the viscosity has dropped lower than the peak viscosity, and
adding the remaining monomer to said polymerization after said peak viscosity and during the continuing polymerization; provided the weight parts of said (a) are based on the weight of the polymerized fatty acid, the weight parts of said (b) are based on the weight of the said salt calculated as a salt, the weight parts of said (c) are based on the weight of disproportionated wood rosin with all of the weights of (a), (b) and (c) being based on 100 parts of monomer charged up to the time of said peak viscosity.

25. A process for the production of high solids latexes having greater than 55 percent by weight of solids which comprises
1. polymerizing monomers comprising chloroprene containing up to 25 percent by weight of another ethylenically unsaturated organic monomer copolymerizable with chloroprene wherein polymerization is initiated in an aqueous emulsion containing 60 to 90 percent of the total of said monomer and salts of cations selected from the group consisting of alkali metals, ammonia and mixtures thereof (a) from 0.15 to 1.0 parts of a fatty acid member selected from the group consisting of unpolymerized fatty acid, polymerized fatty acids and mixtures thereof (b) from 0.30 to 4.0 parts of a formaldehyde condensate of a naphthalene sulfonic acid and (c) from 1.4 to 4.0 parts of a rosin member selected from the group consisting of rosins, disproportionated rosins and polymerized rosins;
2. polymerizing said aqueous emulsion until the viscosity of the polymerization mixture reaches a peak viscosity, 100 percent of the total water being present in said polymerization prior to said peak viscisoty;
3. determining said peak viscosity has been reached;
4. continuing said polymerization until said viscosity at least begins to decline; and
5. adding the remaining monomer and continuing polymerization to form a chloroprene polymer latex having greater than 55 percent solids by weight;

provided the weight parts of said (a) are based on the weight of said fatty acid member, the weight parts of said (b) are based on the weight of said salt calculated as a salt and the weight parts of said (c) are based on the weight of said rosin member with all of the weights of (a), (b) and (c) being based on 100 parts of monomer charged up to the time of said peak viscosity.

* * * * *

UNITED STATES PATENT OFFICE
CERTIFICATE OF CORRECTION

PATENT NO. : 3,890,261
DATED : June 17, 1975
INVENTOR(S) : Kenneth D. Fitzgerald It is certified that error appears in the above-identified patent and that said Letters Patent are hereby corrected as shown below:

Column 13, Line 68 reads "omitted" but should read --- and (c) from 1.4 to 4.0 parts of a rosin member se- ---

Column 14, Line 68 reads "omitted" but should read --- cosity of (1). ---

Column 1, Line 22 reads "relates" but should read --- related ---

Column 3, Line 60 reads "or" but should read --- of ---

Column 8, Line 45 reads "Flock" but should read --- Floc -

Column 8, Line 46 reads "Flock" but should read --- Floc -

Column 14, Line 20 reads "to to" but should read --- to ---

Column 15, line 56 reads " to to " but should read --- to ---

Signed and Sealed this eleventh Day of November 1975

[SEAL]

Attest:

RUTH C. MASON
Attesting Officer

C. MARSHALL DANN
Commissioner of Patents and Trademarks